(12) United States Patent
Kim (10) Patent No.: US 11,124,248 B2
(45) Date of Patent: Sep. 21, 2021

(54) TAILGATE PANEL ASSEMBLY FOR A VEHICLE

(71) Applicants: Hyundai Motor Company, Seoul (KR); Kia Motors Corporation, Seoul (KR)

(72) Inventor: Duck-Young Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 113 days.

(21) Appl. No.: 16/670,276

(22) Filed: Oct. 31, 2019

(65) Prior Publication Data

US 2020/0189666 A1 Jun. 18, 2020

(30) Foreign Application Priority Data

Dec. 14, 2018 (KR) .......................... 10-2018-0162043

(51) Int. Cl.
*B62D 33/027* (2006.01)
*B60R 5/04* (2006.01)
*B60R 13/01* (2006.01)

(52) U.S. Cl.
CPC ............ *B62D 33/027* (2013.01); *B60R 5/041* (2013.01); *B60R 2013/018* (2013.01); *B62D 33/0273* (2013.01); *B62D 33/0276* (2013.01)

(58) Field of Classification Search
CPC .............. B62D 33/027; B62D 33/0273; B62D 33/0276; B62D 25/04; B60R 5/041; B60R 2013/018; E05Y 2900/546; B60J 5/101; B60J 5/107

USPC ................................ 296/39.1, 146.8, 106, 56
See application file for complete search history.

(56) References Cited

U.S. PATENT DOCUMENTS 8,899,658 B1 * 12/2014 Gangal .................... B60J 5/107
296/146.6
2017/0174059 A1 * 6/2017 Miyake ................. E05D 5/0207

FOREIGN PATENT DOCUMENTS

| KR | 20020044959 A | * | 6/2002 | |
| KR | 20080026314 A | | 3/2008 | |
| WO | WO-2010067405 A1 | * | 6/2010 | ........... B62D 25/105 |
| WO | WO-2015123295 A1 | * | 8/2015 | .............. B60J 5/101 |
| WO | WO-2018150376 A1 | * | 8/2018 | ............ B60J 5/0484 |

OTHER PUBLICATIONS

Dong-Cheol Park, "The method for mounting wiring to the tailgate of the vehicle", 2002, The Korean Intellectual Property Office (Year: 2002).*
Tsuyoshi Igura, "Window Panel Vehicle", Jun. 17, 2010, The Japanese Patent Office (Year: 2010).*

* cited by examiner

*Primary Examiner* — Dennis H Pedder
*Assistant Examiner* — Joyce Eileen Hill
(74) *Attorney, Agent, or Firm* — Slater Matsil, LLP (57) ABSTRACT

A tailgate panel assembly for a vehicle includes an outer panel and an inner panel. The outer panel and the inner panel are directly joined to each other at an outer side with respect to a widthwise direction of the vehicle. An extended panel is joined to the inner panel and to the outer panel at an inner side with respect to the widthwise direction of the vehicle, thereby forming a closed cross-section.

18 Claims, 10 Drawing Sheets

FIG.1

PRIOR ART

FIG.2

PRIOR ART

FIG.3

PRIOR ART

FIG.4

PRIOR ART

FIG.5

PRIOR ART

TAILGATE PANEL ASSEMBLY FOR A VEHICLE

CROSS-REFERENCE TO RELATED APPLICATIONS

This application claims priority to Korean Patent Application No. 10-2018-0162043, filed on Dec. 14, 2018, which application is hereby incorporated herein by reference.

TECHNICAL FIELD

The present disclosure relates to a tailgate panel assembly for a vehicle.

BACKGROUND

Figure 1:
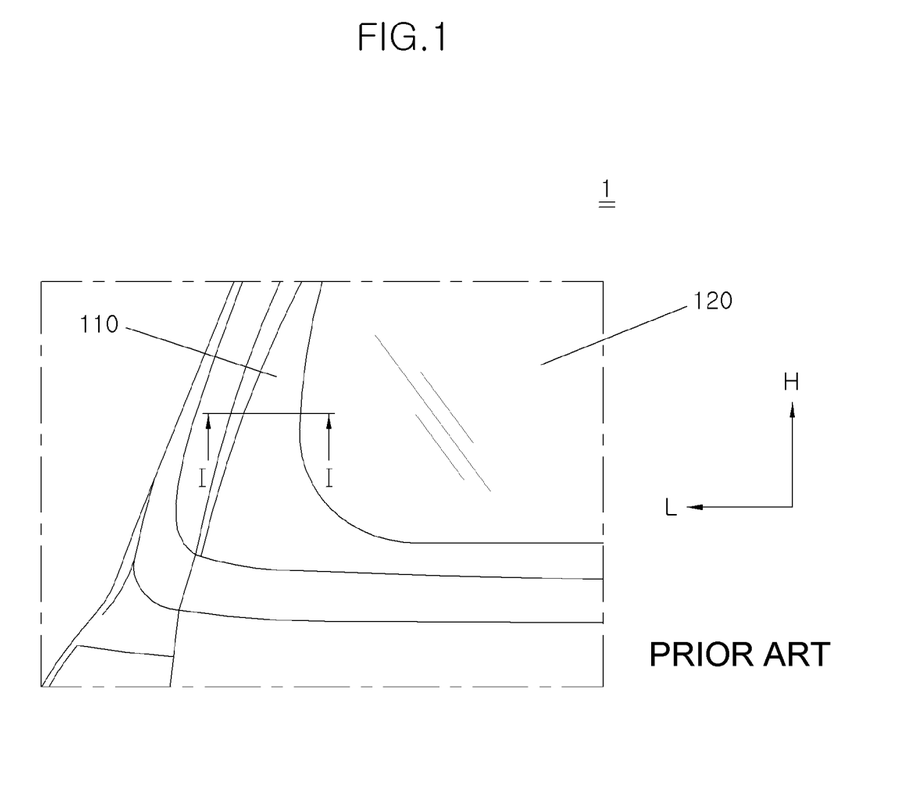
FIG. 1 is a front view of a tailgate to which a tailgate panel assembly according to the prior art is applied.

In a vehicle 1, in particular, in a vehicle such as a sport utility vehicle (SUV), a hatchback, a van, and the like, a tailgate is installed to be opened to the rear of the vehicle. This is shown in FIG. 1.

Figure 2:
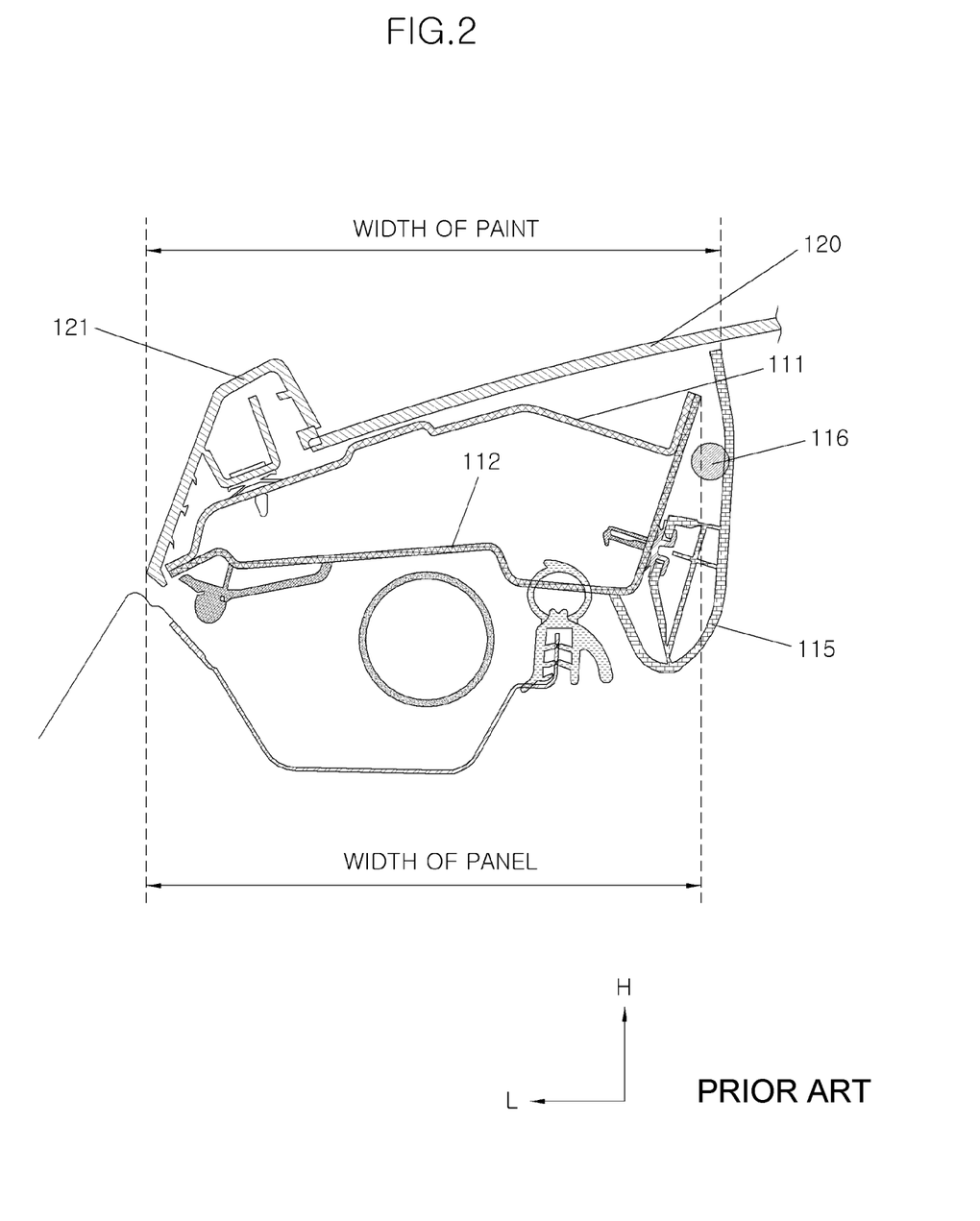
FIG. 2 is a cross-sectional view taken along line I-I in FIG. 1 for showing a cross section of the tailgate panel assembly according to the prior art (when the tailgate is opened).

The tailgate is provided with a tailgate glass 120 installed thereon for securing rear vision. In order to install the tailgate glass 120, a tailgate panel assembly no is formed on the tailgate along a portion where the tailgate glass 120 is installed. In the tailgate assembly, an outer panel 111 and an inner panel 112 are joined to each other to secure rigidity. The tailgate glass 120 is installed on the tailgate panel assembly no using an adhesive such as an adhesive sealer, a trim 115 is installed inside the tailgate panel assembly 110, and an exterior member is attached to the outside of the tailgate panel assembly 110, and so a portion of the tailgate where the tailgate glass 120 is installed is finished.

However, the tailgate panel assembly no according to the prior art as described above has the problems that a cross-section of a portion on which a structure is formed has a wide width, a wiring 116 is placed inside the tailgate panel assembly 110, and a width of the trim 115 should be increased for installing a wiring clip 117 which is used to secure the wiring 116. In addition, the above tailgate assembly has the problem that the above portion is covered with black paint along a periphery of the tailgate glass 120 so that the inside is not visible, and the paint covering the portion has a wide width, and so an openness of the tailgate glass 120 is deteriorated.

Figure 3:
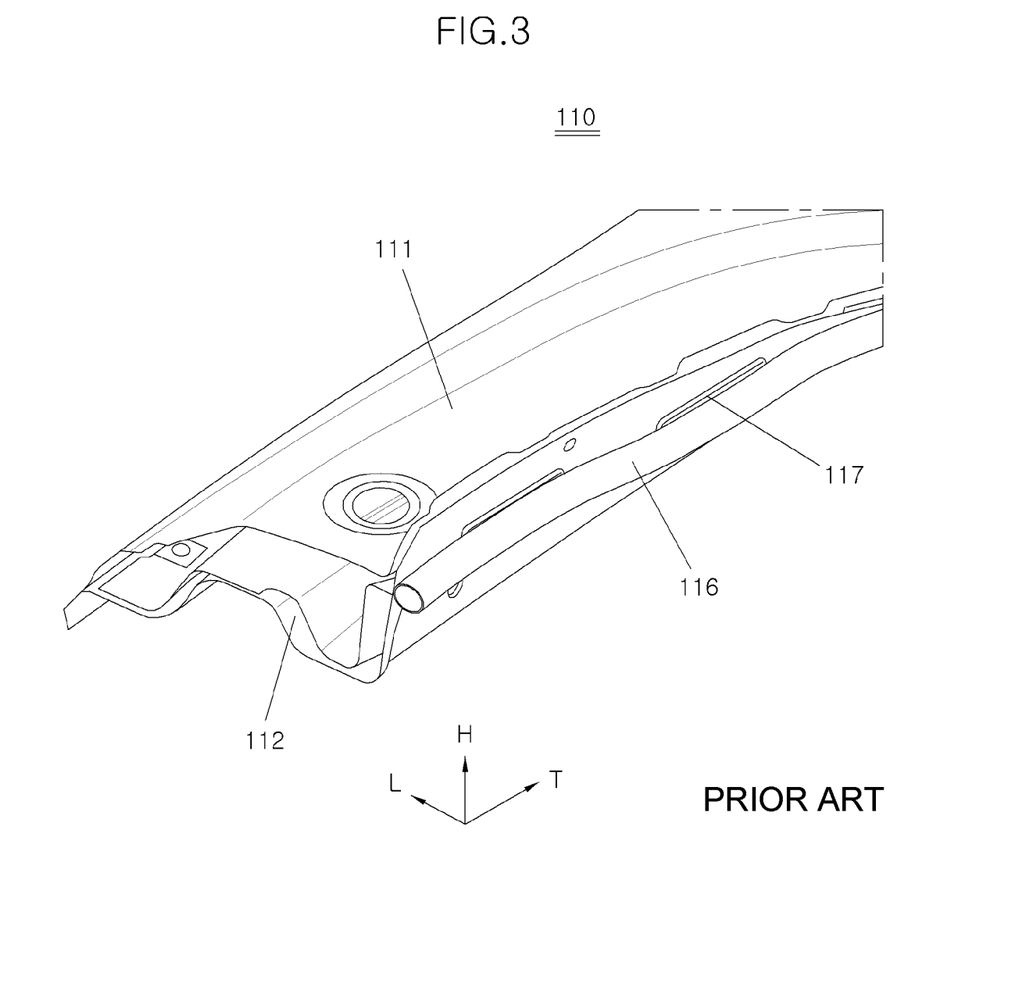
FIG. 3 is a perspective view illustrating a joining state of an outer panel and an inner panel in the tailgate panel assembly according to the prior art (when the tailgate is opened).

In the tailgate panel assembly no, the outer panel in and the inner panel 112 are joined to each other to form a side structure of the tailgate.

The outer panel in and the inner panel 112 are formed to have a predetermined cross-sectional shape, and the outer side (left side in FIG. 4) is fixed by hemming process, and the inner side (right side in FIG. 4) is secured by a welding process. Since the wiring 116 is fixed in a widthwise direction on the inner panel 112 and a width of the sectional area formed by joining the outer panel in and the inner panel 112 is increased, a width of paint for covering this portion is formed to be large, thereby blocking rear vision.

In addition, the width (a lateral direction in FIG. 4) of the sectional area formed by joining the outer panel in and the inner panel 112 is wide and a height (a vertical direction in FIG. 4) is low, and so the tailgate panel assembly is inevitably weak in rigidity.

Figure 4:
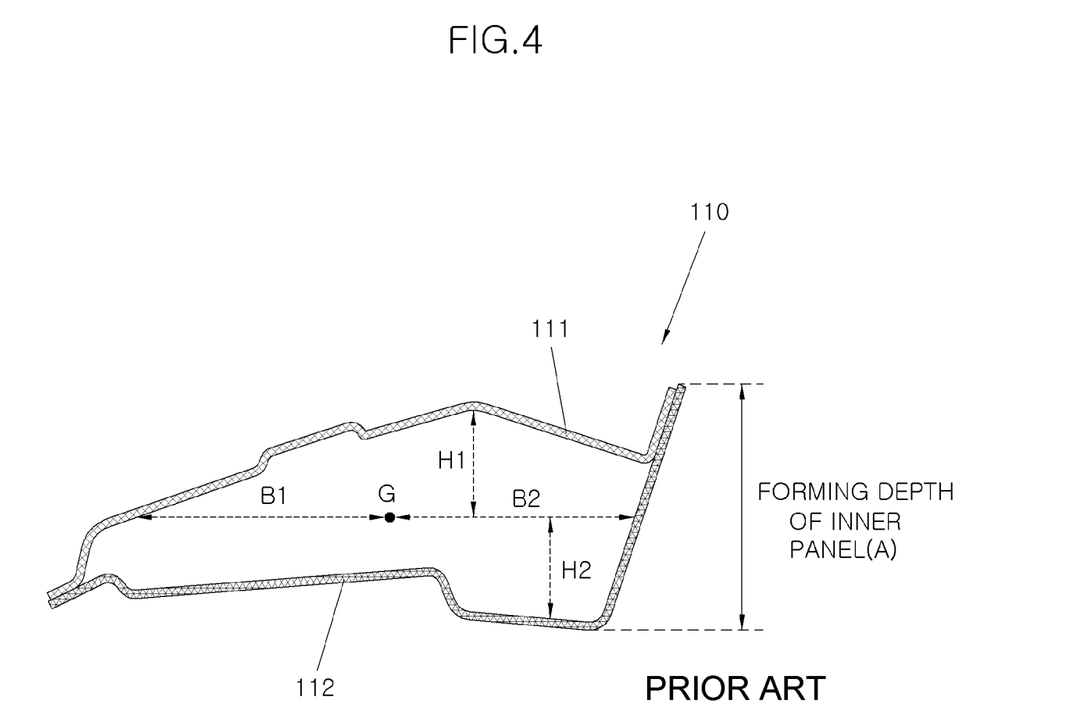
FIG. 4 is a cross-sectional view of the outer panel and the inner panel in the tailgate panel assembly according to the prior art.
Figure 5:
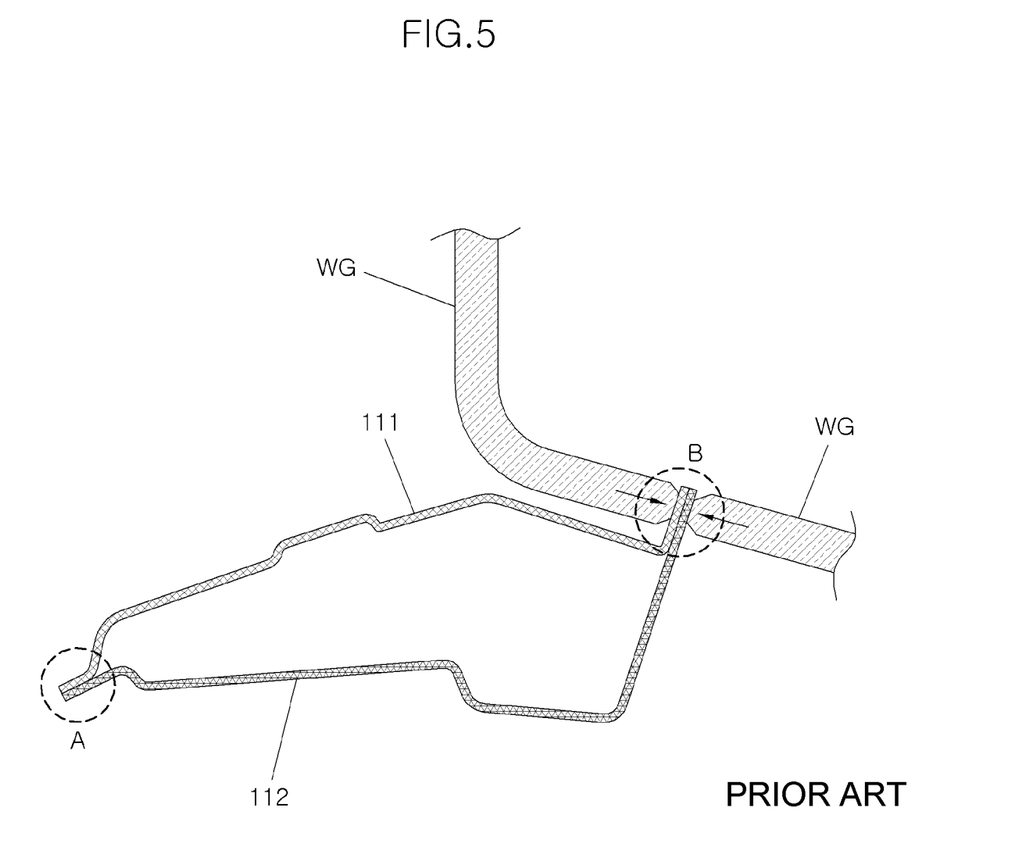
FIG. 5 is a cross-sectional view illustrating a method for joining the outer panel and the inner panel in the tailgate panel assembly according to the prior art.

In addition, since the wiring 116 is located further outward than the inside of a portion where the outer panel in and the inner panel 112 are joined by welding, the trim 115 should wrap around the wiring 116 as well, and so a position of the trim 115 has to be deeply positioned inside the tailgate glass 120.

As described above, in the tailgate panel assembly no, a width of the closed cross-section formed between the outer panel in and the inner panel 112 is thick and the position of the trim 115 is deeply positioned inside the tailgate glass, so that since substantial open area of the tailgate glass 120 is reduced. Consequently, rear vision has been inevitably constrained.

Particularly, in recent years, the spread of compact SUV has been increasing, and the compact SUV is inevitably more disadvantageous in securing visual field due to a portion coated by paint and the trim 115.

The contents described in the Background are to help the understanding of the background of the present disclosure, and may include what is not previously known to those skilled in the art to which the present disclosure pertains.

SUMMARY

Embodiments of the present disclosure relates to a tailgate panel assembly supporting both side surfaces of a tailgate glass to allow the tailgate to be installed on a tailgate of a vehicle. Particular embodiments relate to a tailgate panel assembly having improved rigidity and having a configuration in which a width of cross-section formed by an outer panel and an inner panel is reduced to improve rigidity thereof while improving an openness.

Embodiments of the present disclosure can solve the above-described problem. For example, embodiments can provide a tailgate panel assembly having improved rigidity, which improves rigidity thereof, but allows a width thereof to be reduced to improve rear vision.

In one embodiment, a tailgate panel assembly having improved rigidity has a closed cross-section formed therein by joining both ends of an outer panel and an inner panel having a concave cross-section. The tailgate panel assembly may be characterized in that the outer panel and the inner panel are directly joined to each other at an outer side with respect to a widthwise direction of a vehicle. An extended panel joined to the inner panel is joined to the outer panel at an inner side with respect to the widthwise direction of the vehicle, thereby forming the closed cross-section.

A portion at which the outer panel and the extended panel are joined may be positioned within a width of the closed cross-section composed of the outer panel, the inner panel and the extended panel.

The extended panel may be formed to allow an end portion thereof joined to the outer panel to be stepwisely bent towards the inner side of the width of the closed cross-section composed of the outer panel, the inner panel and the extended panel.

The inner panel and the extended panel may be joined to each other by a structural adhesive.

The inner panel and the extended panel may be joined to each other by a fastener.

The inner panel and the extended panel may be provisionally fastened by the fastener after applying the structural adhesive, and may be are joined to each other by curing the structural adhesive.

In the closed cross-section composed of the outer panel, the inner panel and the extended panel, a distance from the center of gravity of the closed cross-section to an outer wall of the closed cross-section may be formed to be greater than a distance from the center of gravity of the closed cross-section to an inner side wall of the closed cross-section.

In the closed cross-section composed of the outer panel, the inner panel and the extended panel, a distance from the center of gravity of the closed cross-section to a lower wall of the closed cross-section may be formed to be greater than a distance from the center of gravity of the closed cross-section to an upper wall of the closed cross-section.

Paint applied along a periphery of a tailgate glass may have width smaller than the width of the closed cross-section composed of the outer panel, the inner panel and the extended panel.

A wiring may be installed on a stepped portion of the extended panel.

A wiring guide restricting the wiring to be located on a bent portion of the extended panel may be fastened to the extended panel.

DETAILED DESCRIPTION OF ILLUSTRATIVE EMBODIMENTS

Hereinafter, a tailgate panel assembly having improved rigidity according to embodiments of the present disclosure will be described in detail with reference to the accompanying drawings.

In the following description and the accompanying drawings, a detailed description of well-known functions or configurations that can obscure the subject of the present disclosure will be omitted. In addition, it should be noted that the same components are denoted by the same reference numerals as much as possible throughout the entire drawings.

Figure 6:
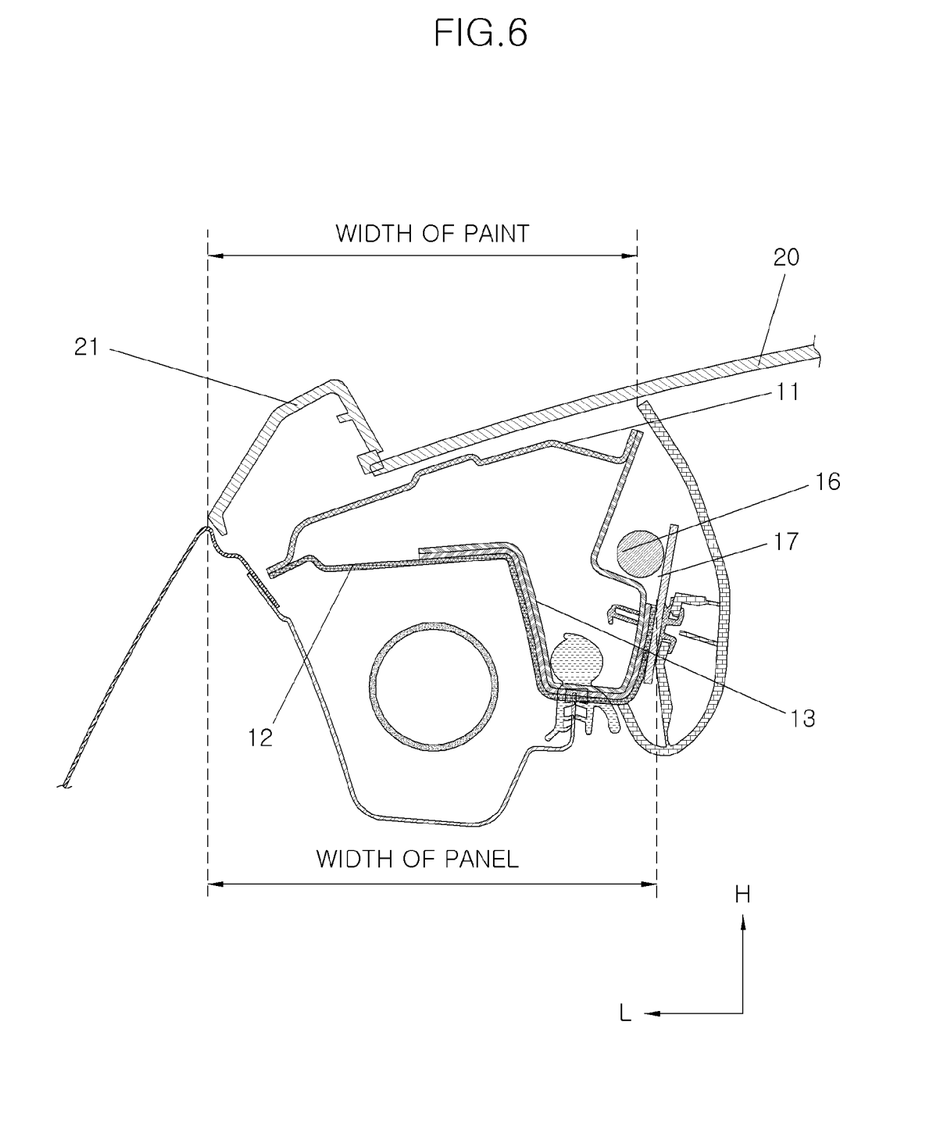
FIG. 6 is a cross-sectional of a tailgate panel assembly having improved rigidity according to embodiments of the present disclosure (when a tailgate is opened).
Figure 7:
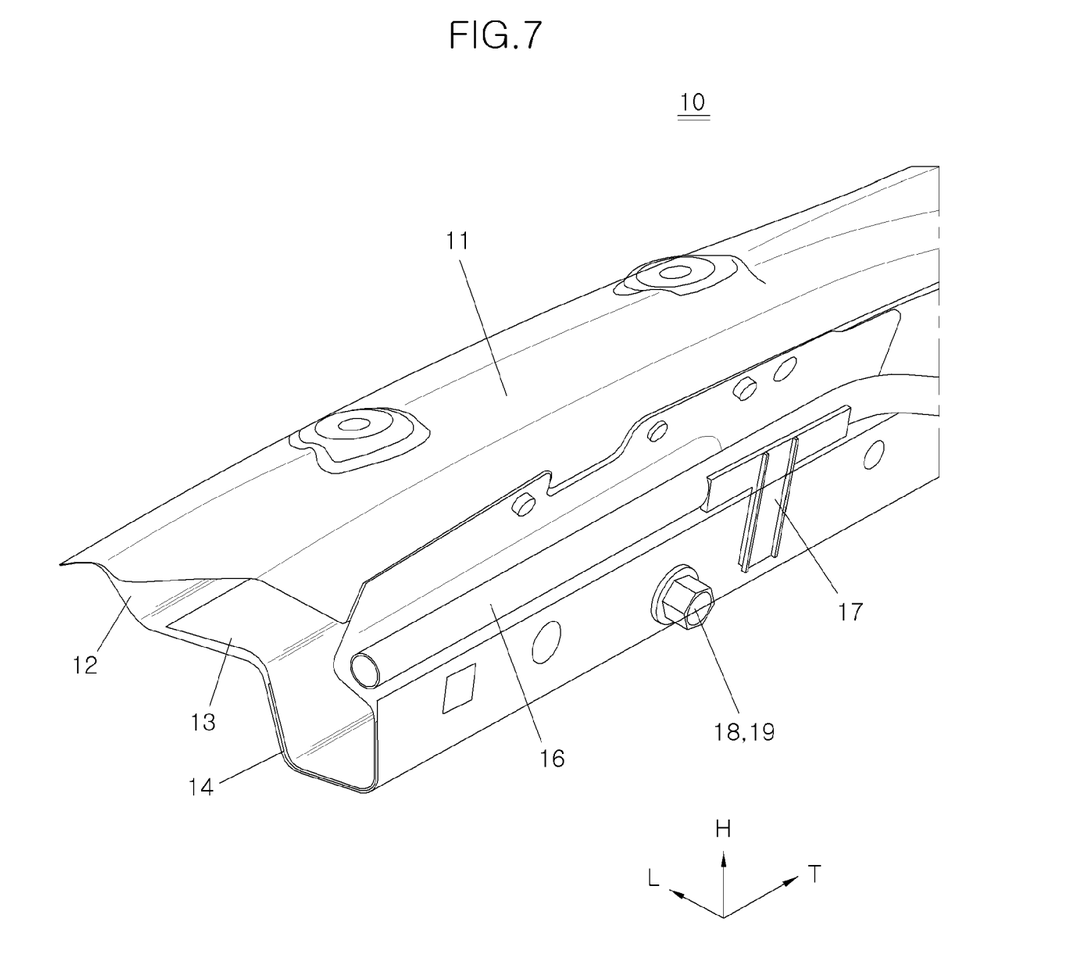
FIG. 7 is a perspective view illustrating a joining state of an outer panel, an inner panel and an extended panel in the tailgate panel assembly having improved rigidity according to embodiments of the present disclosure (when the tailgate is opened).
Figure 8:
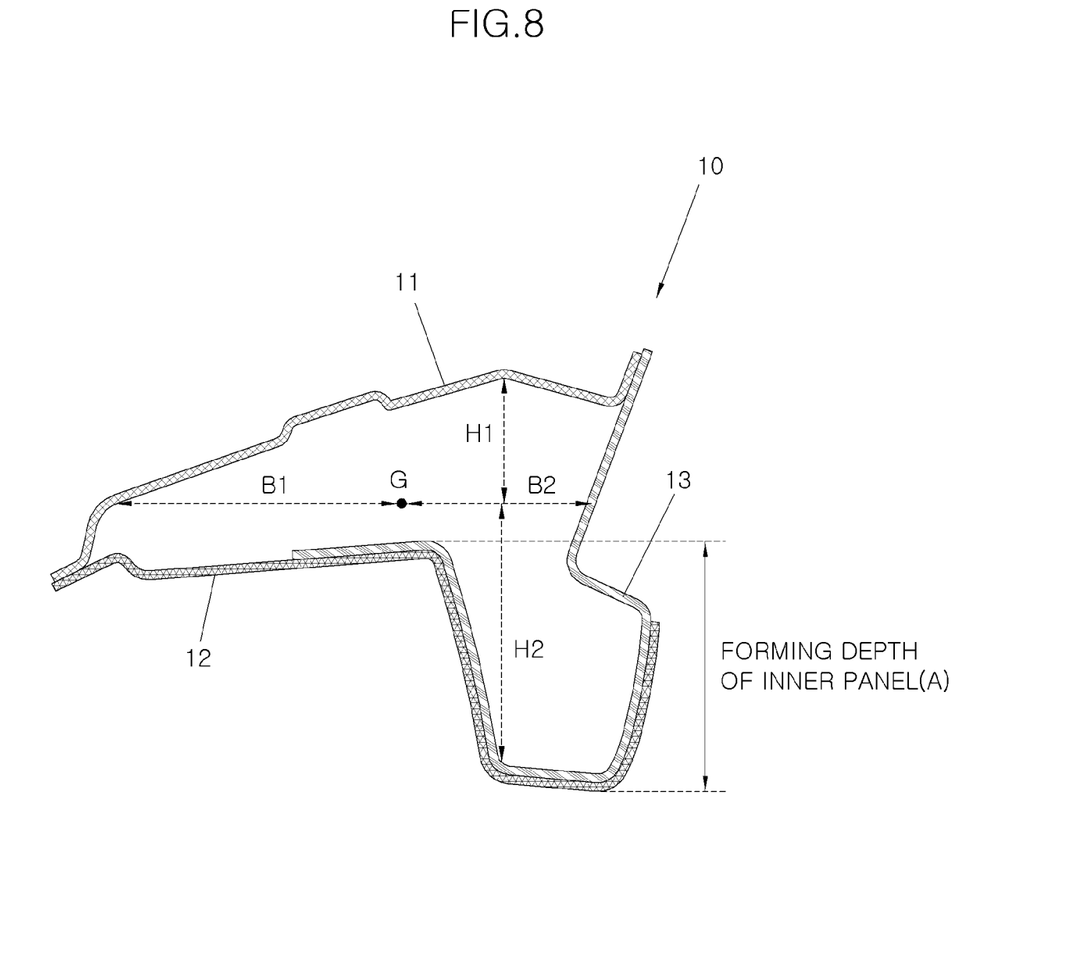
FIG. 8 is a cross-sectional view of the outer panel, the inner panel and the extended panel in the tailgate panel assembly having improved rigidity according to embodiments of the present disclosure.

In a tailgate panel assembly 10 having improved rigidity according to embodiments of the present disclosure, both ends of an outer panel 11 are joined to both ends of the inner panel 12 having a concave cross-section, respectively, to form m a closed cross-section in the tailgate panel assembly. Here, the outer panel 11 and the inner panel 12 are directly joined to each other at an outer side with respect to a widthwise direction of a vehicle and an extended panel 13 joined to the inner panel 12 is joined to the outer panel 11 at an inner side with respect to the widthwise direction of the vehicle to form the closed cross-section.

The outer panel 11 is formed by plastic working to have a predetermined shaped cross-section, so that the outer panel 11 can exhibit rigidity.

The inner panel 12 is formed to have a concave cross-section. The inner panel 12 is also formed by plastic-working to so as to exhibit rigidity.

One side of the inner panel 12 is directly joined to the outer panel 11. For example, outer end portions (A portion in FIG. 10) of the outer panel 11 and the inner panel 12 may be joined to each other by a hemming process.

The extended panel 13 is also formed to have a concave cross-section. The extended panel 13 is positioned at an inner side of the inner panel 12 when a tailgate is opened (a state in which the tailgate is in parallel with the ground).

The extended panel 13 is joined to the inner panel 12, so that an assembly of the extended panel 13 and the inner panel 12 is joined to the outer panel like an inner panel in the prior art.

However, in embodiments of the present disclosure, a forming depth A of the inner panel 12 is increased by separating the inner panel disclosed in the prior art into the inner panel 12 and the extended panel 13, and so it is possible to increase a depth in a cross-section (a vertical direction in FIG. 8) of the tailgate. As the depth in the cross section of the tailgate is increased, even if a width of the panel assembly of the tailgate is reduced, it is possible to exhibit a strength equal to or higher than an equivalent level.

The inner panel 12 and the extended panel 13 overlap each other by a predetermined width in the cross section. A structural adhesive 14 is applied to a portion in the cross-section where the inner panel 12 and the extended panel 13 overlap each other and both panels are then provisionally fastened by a fastener, e.g., a fastening bolt 18 and a fastening nut 19. Thereafter, the structural adhesive 14 is cured at a high temperature to allow the extended panel 13 and the inner panel 12 to be joined.

Figure 10:
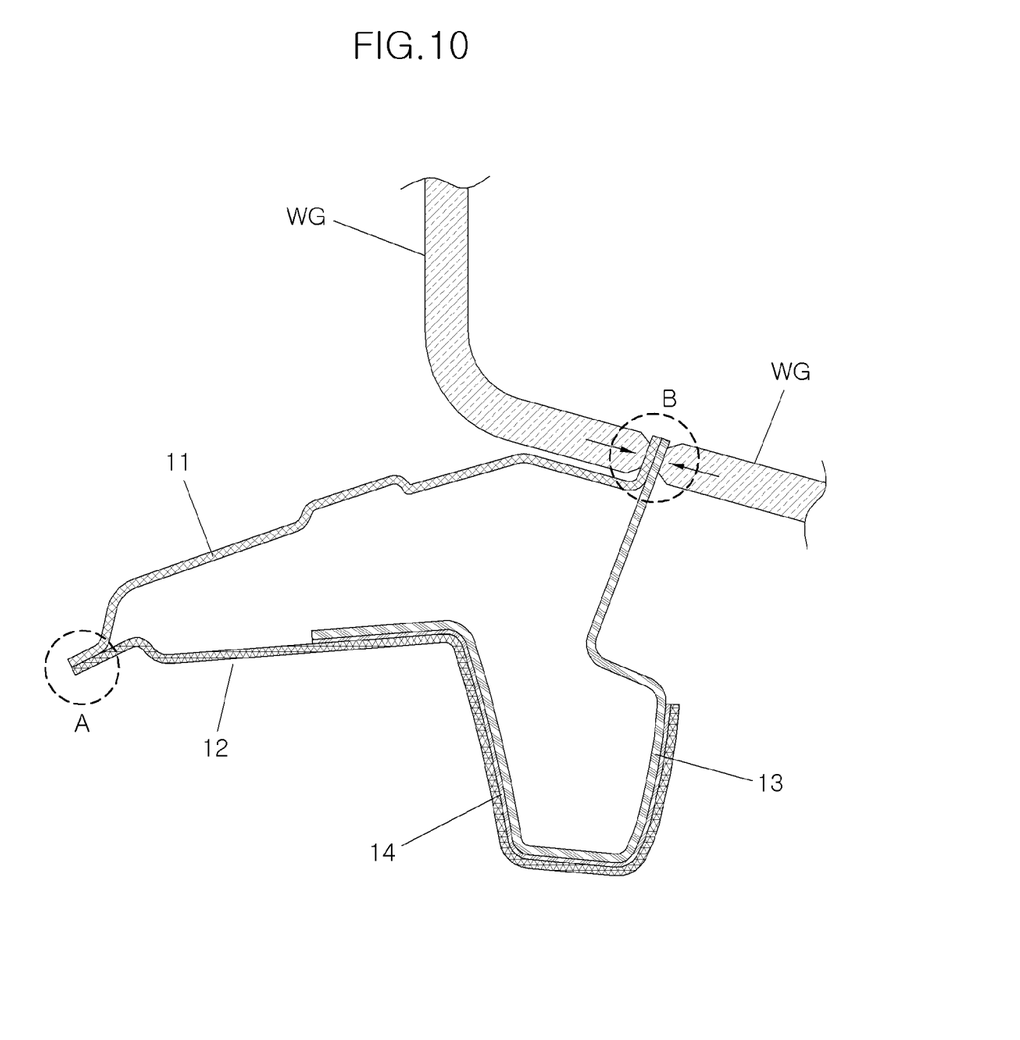
FIG. 10 is a cross-sectional view illustrating a method for joining the outer panel, the inner panel and the extended panel in the tailgate panel assembly having improved rigidity according to embodiments of the present disclosure.

The extended panel 13 and the outer panel 11 are joined to each other by welding, for example, spot welding, as illustrated in FIG. 10. The extended panel 13 and the outer panel 11 are welded to each other by operating a welding gun WG in a direction perpendicular to a joining surface of the extended panel 13 and the outer panel 11.

An upper portion of the extended panel 13 is formed to be bent outward in a widthwise direction. The extended panel 13 is formed such that an upper end portion thereof is bent to be positioned at an inner side of the tailgate panel assembly 10 more than a middle portion of the extended panel 13.

The outer panel 11, the inner panel 12 and the extended panel 13 are joined to form the closed cross-section. As described above, by using the outer panel 11, the inner panel 12 and the extended panel 13, a side structure of the tailgate, that is, a side structure of a portion of the tailgate to which a tailgate glass 20 is mounted is formed.

In the closed cross-section composed of the outer panel 11, the inner panel 12 and the extended panel 13, a distance B1 from the center of gravity G of the closed cross-section to an outer wall of the closed cross-section is formed to be greater than a distance B2 from the center of gravity G of the closed cross-section to an inner side wall of the closed cross-section (B1>B2), and a distance H2 from the center of gravity G of the closed cross-section to a lower wall of the closed cross-section is formed to be greater than a distance H1 from the center of gravity G of the closed cross-section to an upper wall of the closed cross-section (H2>H1).

As described above, as compared with the prior art, in embodiments of the present disclosure, the center of gravity G is moved within the closed cross-section towards an outer side of the vehicle and a height ratio is relatively increased, and therefore the rigidity of the tailgate is increased.

Figure 9:
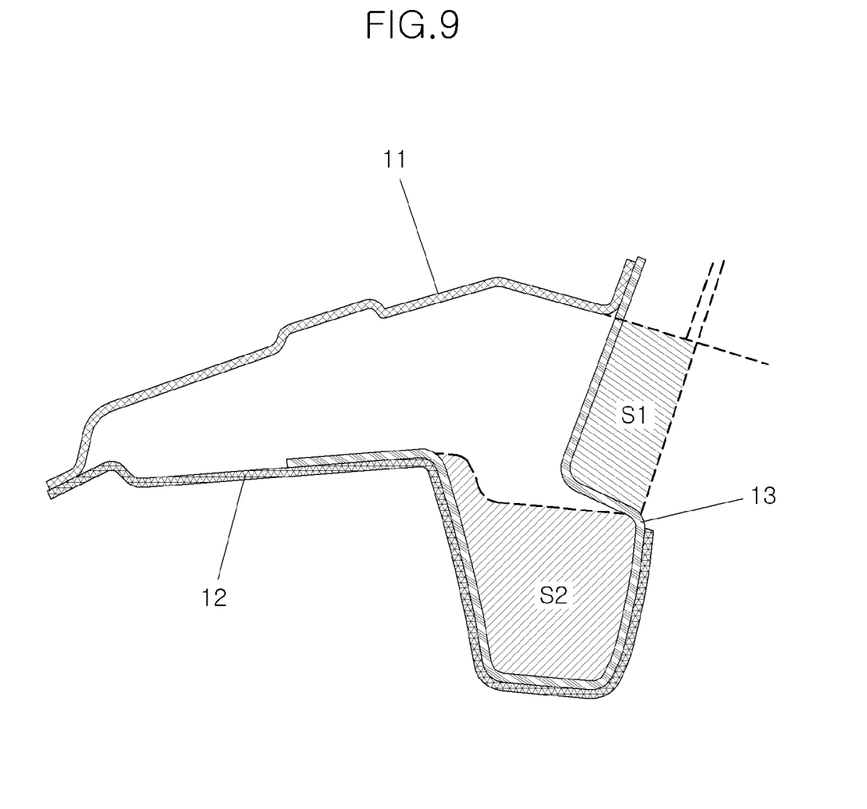
FIG. 9 is a cross-sectional view illustrating a portion where a sectional area is decreased and a portion where a sectional area is increased by the tailgate panel assembly having improved rigidity according to embodiments of the present disclosure.

In addition, according to embodiments of the present disclosure, as illustrated in FIG. 9, the area S1 of a portion where a wiring 16 is provided is reduced as compared with the prior art, and the area S2 of a portion becoming more concave downward from the inner panel 12 and the extended panel 13 is increased as compared with the prior art.

Particularly, in embodiments of the present disclosure, by forming the area S2 of increased portion to be larger than the area S1 of the reduced portion (S2>S1), the overall area is also increased.

As described above, as the overall sectional area is increased, it is possible to enhance the rigidity of the tailgate.

Since the upper portion of the extended panel 13 is formed to be stepped and the wiring 16 is positioned on the stepped portion, the wiring 16 is not located at an outer side of the panel, but is located at an inner side of a width of the panel, and therefore a space for installing the wiring 16 is not required separately. That is, by substantially placing the wiring 16 within the width of the closed cross-section composed of the outer panel 11, the inner panel 12 and the extended panel 13, the width of the tailgate panel assembly 10 is not increased by the wiring 16.

As the sectional area of the panel at a side of the tailgate is reduced by applying the extended panel 13, a width of the tailgate panel assembly 10 can be made to be smaller than a width of a portion, that is called "frit", of the tailgate glass 20 to which paint is applied, and so this configuration is advantageous for securing rear vision.

FIG. 6 illustrates that a width of the sectional area of the closed cross-section composed of the outer panel 11, the inner panel 12 and the extended panel 13 is reduced to be smaller than that of the paint applied for joining the tailgate glass 20.

A wiring guide 17 restricting the wiring 16 to be positioned at a bent portion in the extended panel 13 is fastened to the extended panel 13.

By fastening a lower end of the wiring guide 17 to the extended panel 13 and placing an upper end at a location higher than the bent portion of the extended panel 13, the wiring 16 is substantially positioned within the width of the closed cross-section composed to the outer panel 11, the inner panel 12 and the extended panel 13.

In particular, the upper end of the wiring guide 17 is formed to be extended in a longitudinal direction of the wiring 16, and so the wiring guide 17 is formed in a T shape.

A trim 15 is coupled to cover the inner panel 12, the extended panel, the wiring 16 and the wiring guide 17.

Reference numeral 21, which is not described above, is indicative of an exterior member surrounding an outer periphery of the tailgate glass 20.

According to the tailgate panel assembly having improved rigidity according to embodiments of the present disclosure having the above-described structure, a height of the sectional area formed by joining the outer panel and the inner panel is increased, thereby improving the rigidity.

Further, since the width of a joining portion of the outer panel and the inner panel is reduced, an openness for rear vision is enhanced.

By placing a portion, where the outer panel and the inner panel are joined, at an outer side of the inner end portion of the inner panel, and installing the wiring between the joining portion and the inner end portion of the inner panel, no additional space is required for installing the wiring, so that it is possible to shift a location of the trim to an outer side of the joining portion, thereby improving rear vision.

Although the present disclosure has been described with a focus on novel features of the present disclosure applied to various embodiments, it will be apparent to those skilled in the art that various deletions, substitutions, and changes in the form and details of the apparatus and method described above may be made without departing from the scope of the present disclosure. Accordingly, the scope of the present disclosure is defined by the appended claims rather than by the foregoing description. All modifications within the equivalent scope of the appended claims are embraced within the scope of the present disclosure.

What is claimed is:

1. A tailgate panel assembly for a vehicle, the tailgate panel assembly comprising:
   an outer panel;
   an inner panel that is located farther from a glass section of the tailgate than the outer panel, wherein the outer panel and the inner panel are directly joined to each other at an outer side with respect to a widthwise direction of the vehicle; and
   an extended panel joined to the inner panel and to the outer panel at an inner side with respect to the widthwise direction of the vehicle, thereby forming a single closed cross-section, wherein a portion at which the inner panel and the extended panel are joined is positioned within a width of the single closed cross-section composed of the outer panel, the inner panel and the extended panel.

2. The tailgate panel assembly of claim 1, wherein a portion at which the outer panel and the extended panel are joined is positioned within a width of the closed cross-section composed of the outer panel, the inner panel and the extended panel.

3. The tailgate panel assembly of claim 2, wherein the extended panel is formed to allow an end portion thereof joined to the outer panel to be stepwise bent towards the inner side of the width of the closed cross-section composed of the outer panel, the inner panel and the extended panel.

4. The tailgate panel assembly of claim 1, wherein the inner panel and the extended panel are joined to each other by a structural adhesive.

5. The tailgate panel assembly of claim 4, wherein the inner panel and the extended panel are joined to each other by a fastener.

6. The tailgate panel assembly of claim 5, wherein the fastener comprises a fastening bolt and a fastening nut.

7. The tailgate panel assembly of claim 5, wherein the inner panel and the extended panel are provisionally fastened by the fastener after applying the structural adhesive, and are joined to each other by curing the structural adhesive.

8. The tailgate panel assembly of claim 1, wherein, in the closed cross-section composed of the outer panel, the inner panel and the extended panel, a distance from the center of gravity of the closed cross-section to an outer wall of the closed cross-section is formed to be greater than a distance from the center of gravity of the closed cross-section to an inner side wall of the closed cross-section.

9. The tailgate panel assembly of claim 1, wherein, in the closed cross-section composed of the outer panel, the inner panel and the extended panel, a distance from the center of gravity of the closed cross-section to a lower wall of the closed cross-section is formed to be greater than a distance from the center of gravity of the closed cross-section to an upper wall of the closed cross-section.

10. The tailgate panel assembly of claim 1, wherein the tailgate glass is formed at a side structure of a portion of the closed cross-section.

11. The tailgate panel assembly of claim 1, wherein paint applied along a periphery of the tailgate glass has a width smaller than a width of the closed cross-section composed of the outer panel, the inner panel and the extended panel.

12. The tailgate panel assembly of claim 1, further comprising a wiring installed on a stepped portion of the extended panel.

13. The tailgate panel assembly of claim 12, further comprising a wiring guide restricting the wiring to be located on a bent portion of the extended panel, the wiring guide being fastened to the extended panel.

14. A tailgate panel assembly for a vehicle, the tailgate panel assembly comprising:
an outer panel;
an inner panel, wherein the outer panel and the inner panel are joined by a fastener or an adhesive, the outer panel and the inner panel joined to each other at an outer side with respect to a widthwise direction of the vehicle;
an extended panel joined to the inner panel and to the outer panel at an inner side with respect to the widthwise direction of the vehicle thereby forming a closed cross-section, wherein the extended panel includes a stepped portion between the outer panel and the inner Panel, the stepped portion being spaced from both the outer panel and the inner panel;
a wiring installed on the stepped portion of the extended panel; and
a wiring guide attached to the extended panel to restrict the wiring to be located on the stepped portion of the extended panel.

15. The tailgate panel assembly of claim 14, wherein the outer panel and the inner panel are joined by both the fastener and the adhesive.

16. The tailgate panel assembly of claim 14, wherein, in the closed cross-section composed of the outer panel, the inner panel and the extended panel, a distance from the center of gravity of the closed cross-section to an outer wall of the closed cross-section is formed to be greater than a distance from the center of gravity of the closed cross-section to an inner side wall of the closed cross-section.

17. The tailgate panel assembly of claim 14, wherein, in the closed cross-section composed of the outer panel, the inner panel and the extended panel, a distance from the center of gravity of the closed cross-section to a lower wall of the closed cross-section is formed to be greater than a distance from the center of gravity of the closed cross-section to an upper wall of the closed cross-section.

18. The tailgate panel assembly of claim 14, wherein the extended panel includes a first end contacting the outer panel but not the inner panel and a second end contacting the inner panel but not the outer panel;
wherein the extended panel includes first, second and third segments between the first end and the second end, the first segment contacting the first end and the third segment contacting the second end;
wherein the first, second and third segments are each spaced from both the inner panel and the outer panel;
wherein the first segment extends away from the outer panel, the second segment is arranged at an angle relative to the first segment and extends away from the first segment, and the third segment is arranged at an angle relative to the second segment and extends away from the second segment; and
wherein the stepped portion is created by the first and second segments.

* * * * *